Patented Mar. 25, 1924.

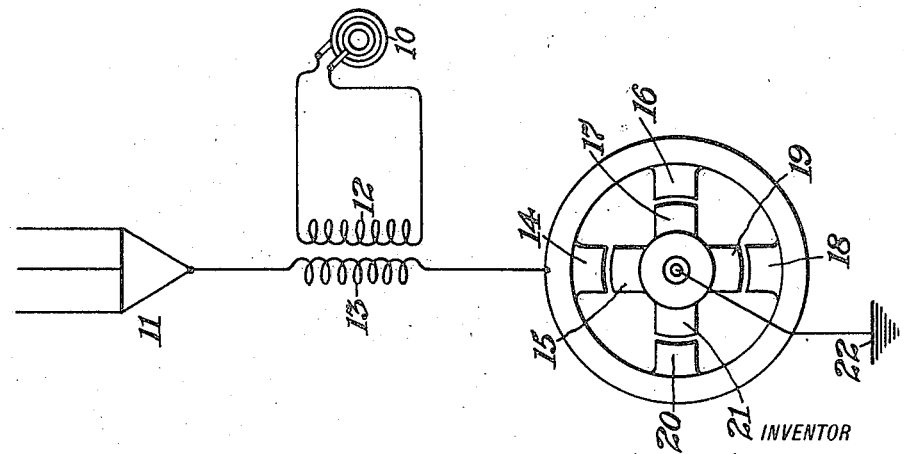
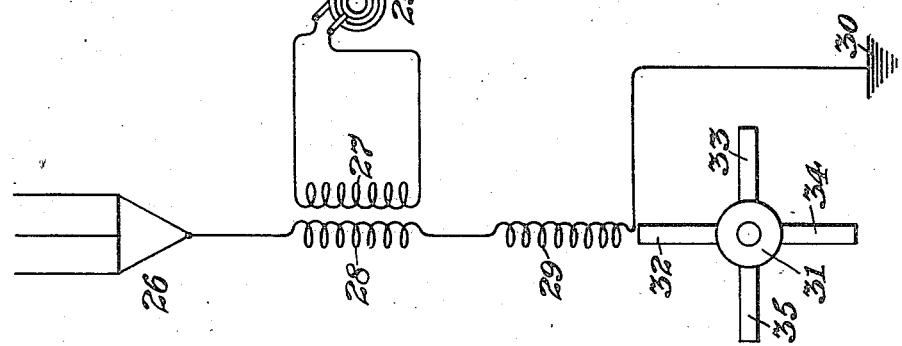
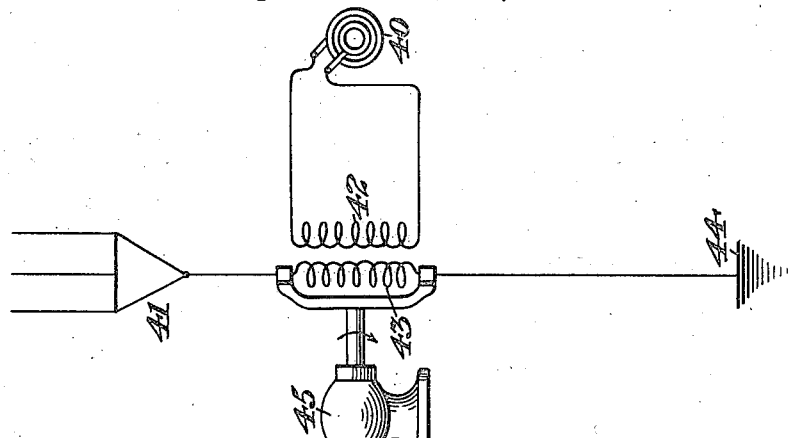

1,488,114

UNITED STATES PATENT OFFICE.

JOHN HAYS HAMMOND, JR., OF GLOUCESTER, MASSACHUSETTS.

RADIO TELEGRAPHY AND TELEPHONY.

Original application filed August 24, 1912, Serial No. 716,864. Patent No. 1,296,504, dated March 4, 1919. Divided and this application filed February 24, 1919. Serial No. 278,878. Renewed August 25, 1923.

*To all whom it may concern:*

Be it known that I, JOHN HAYS HAMMOND, Jr., a citizen of the United States, residing at Gloucester, in the State of Massachusetts, have invented certain new and useful Improvements in Radio Telegraphy and Telephony, of which the following is a specification, this application being a division of my application, Serial No. 233,790, filed May 10, 1918, renewal of Serial No. 716,864, filed August 24, 1912, and issued as Patent No. 1,296,504, dated March 4, 1919.

My invention relates to systems of telegraphy and telephony, and relates more particularly to improved systems and methods for periodically varying the amplitude or frequency or both of transmitted electric waves.

Means for accomplishing this result have been proposed, but they are limited to some form of periodical variation of the resistance at the transmitting station, and, moreover, the rate of amplitude variation is limited to frequencies below the limits of audibility. It has been shown that the variable resistance method is an inferior one for producing amplitude variations, mainly for the reason that a change in resistance of, say, one per cent will produce a change in the received current intensity of only equal value, or one per cent.

Now it is well known in the art of radio telegraphy that if a properly designed transmitter and receiver are oscillating in resonance, a change in wave length or frequency of one-tenth of one per cent of either transmitter or receiver will destroy the condition of resonance between them. The same is true in the case of two tuned circuits of a transmitting station or two tuned circuits of a receiving station. This change in wave length or frequency may be produced by changing either the capacity or the inductance of an oscillatory circuit, so that, for instance, if a change of one per cent be made in either the capacity or the inductance of the transmitter, a change of perhaps one hundred per cent may be caused in the intensity of the received signals. It is also possible, by periodically varying the capacity or the inductance of the transmitting circuits, to produce a received impulse of a sinusoidal character. Furthermore, the variations produced in the transmitting apparatus should preferably be of a very peaked form rather than of a more sinusoidal form. The reason for this, as I have found in experimental practice, is that through the resistance of circuits there is a tendency for the wave form to be flattened out at the receiving station, and therefore, in order to produce a true sinusoidal wave form at the receiving station, it is necessary to produce a very peaked wave form at the transmitting station.

Referring to the accompanying drawings:

Figure 1 shows transmitting apparatus for radio telegraphy and telephony, provided with means for varying the capacity of the antenna circuit.

Figure 2 shows transmitting apparatus having means for varying the inductance of the antenna circuit.

Figure 3 shows transmitting apparatus having means for varying the mutual inductance between the antenna circuit and the oscillation generator.

In the embodiment of the invention shown in Figure 1, a high-frequency alternator 10 impresses high-frequency oscillations upon the antenna 11 by means of the coils 12 and 13. In circuit with the antenna 11 are the inductance coil 13, the rotary condenser 14, 15, 16, 17, 18, 19, 20, 21, and the ground 22. The rotary condenser comprises a fixed member formed with capacity areas 14, 16, 18 and 20, and a rotary member constructed to provide capacity areas 15, 17, 19 and 21. When the rotary member is rotated at a uniform rate, periodic variations in the capacity of the antenna circuit are produced, which produce corresponding changes in the degree of resonance between the antenna circuit and the high-frequency generator 10, and therefore cause the radiation of electric waves of periodically varying amplitude and frequency, the periodicity of these variations being dependent upon the speed of the rotary member of the condenser and the number of the capacity areas of the condenser. By properly designing the rotary condenser, the amplitude variations may be caused to have the peaked characteristics so essential to good tuning, and the variations in the capacity being great enough to produce large amplitude variations in the radiated waves. The rate of variation, moreover, may have any desired value, either within the limits of audibility, above these limits, or below them.

A receiving station, with properly tuned circuits, will therefore respond to signals sent from the corresponding transmitting station, and a highly selective system of radio communication may be thus established.

In the use of the embodiment of the invention shown in Figure 2, a high-frequency alternator 25 impresses oscillations upon the antenna 26 by means of the coils 27 and 28. In circuit with the antenna 26 are the inductance coils 28 and 29 and the ground 30. A rotary regulator element 31, having pole pieces 32, 33, 34 and 35, composed of iron or other magnetic substance, is mounted in proximity to the coil 29, so that when the regulator 31 is rotated, periodic variations are caused in the inductance of the coil 29, and hence in the inductance of the antenna circuit. These variations in inductance cause corresponding variations in the resonance between the antenna circuit and the oscillation generator, and therefore cause the radiation of electric waves of periodically varying amplitude, the periodicity of the amplitude variations being dependent upon the speed of rotation of the element 31 and upon the number of its pole pieces.

In Figure 3, a high-frequency alternator 40 impresses oscillations upon the antenna 41 by means of the coils 42 and 43. The antenna 41 is in circuit with inductance coil 43 and is grounded at 44. A motor 45 is mechanically connected to coil 43 for rotating the latter so as to alter the mutual inductance between coils 43 and 42 while at the same time maintaining the coil 43 continuously in circuit between the antenna 41 and ground 44. When motor 45 rotates coil 43, periodic amplitude variations are thus caused in the electric waves radiated from the antenna 41.

What I claim is:

1. In a radio transmission system, the combination with a transmitting circuit arranged to emit high frequency waves, of means for impressing periodic amplitude variations upon said waves by periodically varying an electrical constant of the transmitting circuit in such a manner that the time-intensity curves shall be peaked.

2. In a radio system, the combination with means including an electrical capacity for transmitting high frequency waves, of means operative to vary said capacity periodically to impress amplitude variations upon said waves in such a manner that the time-intensity curves shall be peaked.

3. In a radio system, the combination with means including an electrical capacity for transmitting high frequency waves, of means operative to vary said capacity periodically and at a rate above the limits of audibility to impress amplitude variations upon said waves.

4. In a radio system, the combination with means including an electrical capacity for transmitting high frequency waves, of means operative to vary said capacity periodically and at a rate above the limits of audibility to impress amplitude variations upon said waves in such a manner that the time-intensity curves shall be peaked.

Signed at New York, in the county of New York and State of New York, this 11th day of February, A. D. 1919.

JOHN HAYS HAMMOND, JR.